United States Patent
Yu et al.

(10) Patent No.: US 6,463,542 B1
(45) Date of Patent: Oct. 8, 2002

(54) POWER MANAGEMENT INDICATION MECHANISM FOR SUPPORTING POWER SAVING MODE IN COMPUTER SYSTEM

(75) Inventors: Ching Yu, Santa Clara; Jerry Chun-Jen Kuo; Jeffrey Dwork, both of San Jose; Din-I Tsai, Fremont, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/321,834

(22) Filed: May 28, 1999

(51) Int. Cl.[7] .................................................. G06F 1/00

(52) U.S. Cl. ...................... 713/320; 713/324; 713/340; 713/323; 709/224

(58) Field of Search ................................ 709/227, 224; 713/300, 310, 323, 324

(56) References Cited

U.S. PATENT DOCUMENTS

| | | | | | |
|---|---|---|---|---|---|
| 5,440,690 | A | * | 8/1995 | Rege et al. ................... | 713/323 |
| 5,708,820 | A | * | 1/1998 | Park et al. ................... | 713/300 |
| 5,742,833 | A | * | 4/1998 | Dea et al. ................... | 713/323 |
| 5,802,305 | A | * | 9/1998 | McKaughan et al. ......... | 709/57 |
| 5,809,223 | A | * | 9/1998 | Lee et al. ....................... | 714/4 |
| 5,938,771 | A | * | 8/1999 | Williams et al. ............ | 713/310 |
| 6,112,247 | A | * | 8/2000 | Williams ..................... | 709/236 |
| 6,292,831 | B1 | * | 9/2001 | Cheung ....................... | 709/224 |
| 6,311,276 | B1 | * | 10/2001 | Connery et al. ............. | 713/201 |

* cited by examiner

Primary Examiner—Peter Wong
Assistant Examiner—Raymond N Phan

(57) ABSTRACT

A novel method of power management is provided in a computer system having a network interface module including a buffer memory and a MAC block. The method includes determining whether the system is inactive during a predetermined time period. If so, activity of the MAC block is checked. If the MAC block is idle, the status of the buffer memory is determined. The system is placed into a power-down mode if the buffer memory is empty.

11 Claims, 5 Drawing Sheets

POWER MANAGEMENT INDICATION MECHANISM FOR SUPPORTING POWER SAVING MODE IN COMPUTER SYSTEM

FIELD OF THE INVENTION

The present application relates to data communications and in particular to a system for providing power management in a network controller.

BACKGROUND ART

The growing power need of computer systems lead computer manufacturers to develop computer system with power management capabilities. For example, a personal computer may be provided with a power management system to place the computer in a power-down mode when no activity is detected during a preset time period. As a result, the power consumption of the computer may be substantially reduced.

In a data communications network, such as an Ethernet (IEEE 802.3) network, a network controller chip provides interface between a local bus of a computer system and network media. To reduce power consumption, when a computer system is placed in a power-down mode, the network controller chip also may be placed in a power-down mode.

The CPU of the computer system performs power management operations using software monitoring of the computer system activity. However, the CPU does not directly monitor the network activity. Therefore, placing the system into a power-down mode can result in the loss of data being transmitted to or received from the network.

To prevent data from being lost during power management operations, it would be desirable to provide the network controller with a power management indication system that indicates to the CPU when the network controller may be safely placed into a power-down mode.

DISCLOSURE OF THE INVENTION

The present invention offers a novel method of providing power management in a computer system having a network interface module including a buffer memory and a media access control (MAC) block. The method comprises determining whether the system is inactive during a predetermined time period. If so, activity of the MAC block is checked. If the MAC block is idle, the status of the buffer memory is determined. The system is placed into a power-down mode if the buffer memory is empty.

In accordance with one aspect of the invention, a network interface provided in a computer system controlled by a host and having power management capabilities for supporting a power saving mode, comprises a power management indication mechanism for providing the host with information on network activity when the system is placed in the power saving mode.

The power management indication mechanism may have a MAC indicator representing status of the MAC block activity. The MAC indicator may comprise a transmit idle indicator set to a preset state when the MAC block does not transmit data to the network and no data is waiting to be transmitted to the network. Also, the MAC indicator may comprise a receive idle indicator set to a preset state when the MAC block detects no data to be received from the network.

Further, the power management indication mechanism may have a buffer memory indicator representing status of the buffer memory. The buffer memory indicator may comprise a transmit buffer empty indicator set to a preset state when a transmit portion of the buffer memory is empty. Also, the buffer memory indicator may comprise a receive buffer empty indicator set to a present state when a receive portion of the buffer memory is empty.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

The present invention will be described with the example of a network interface in a packet switched network, such as an Ethernet (IEEE 802.3) network. It will become apparent, however, that the present invention is applicable to any peripheral device in any data processing system.

Figure 1A:
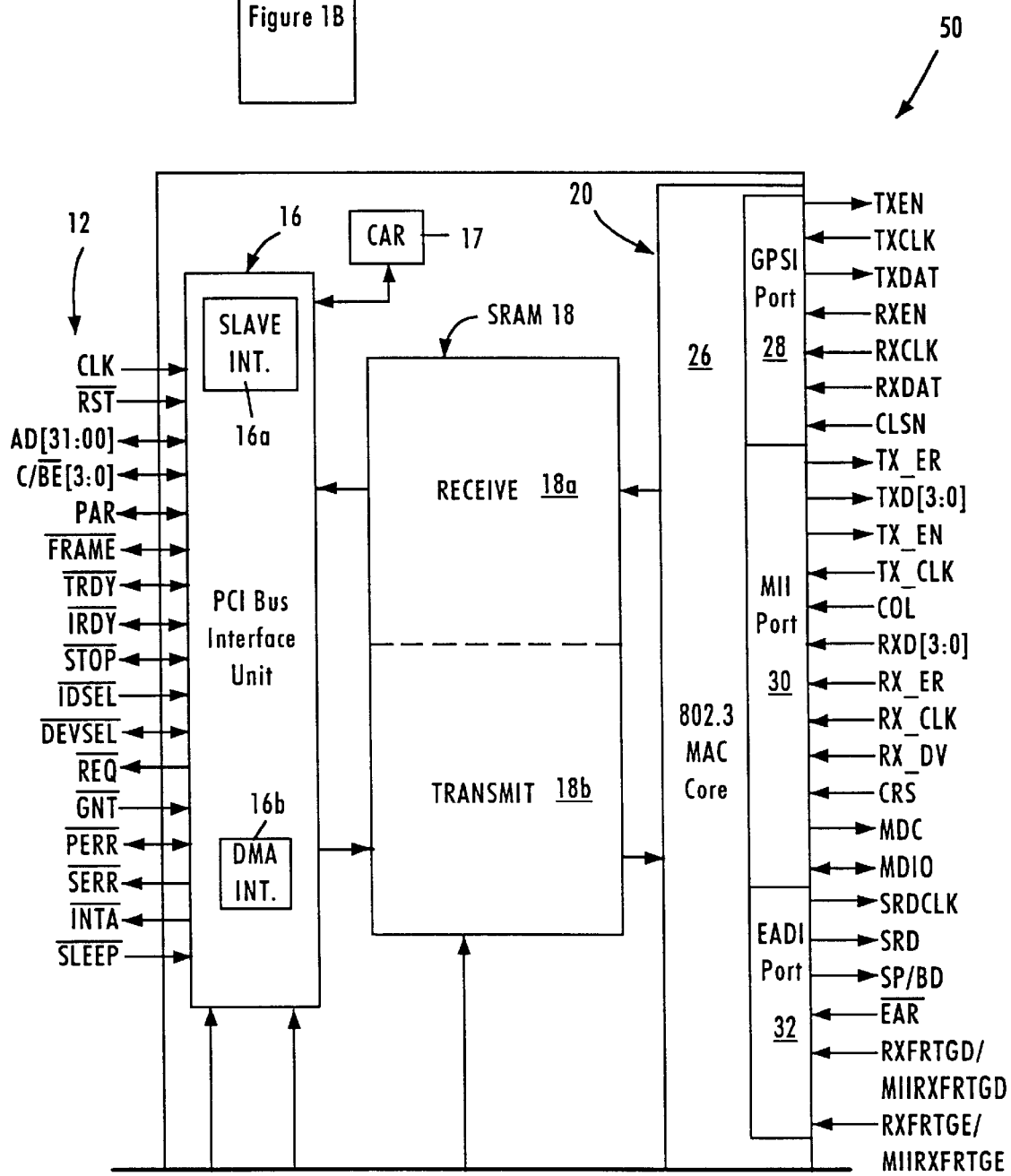
FIG. 1 is a block diagram illustrating an exemplary network interface, which may be used for implementing the present invention.
Figure 1B:
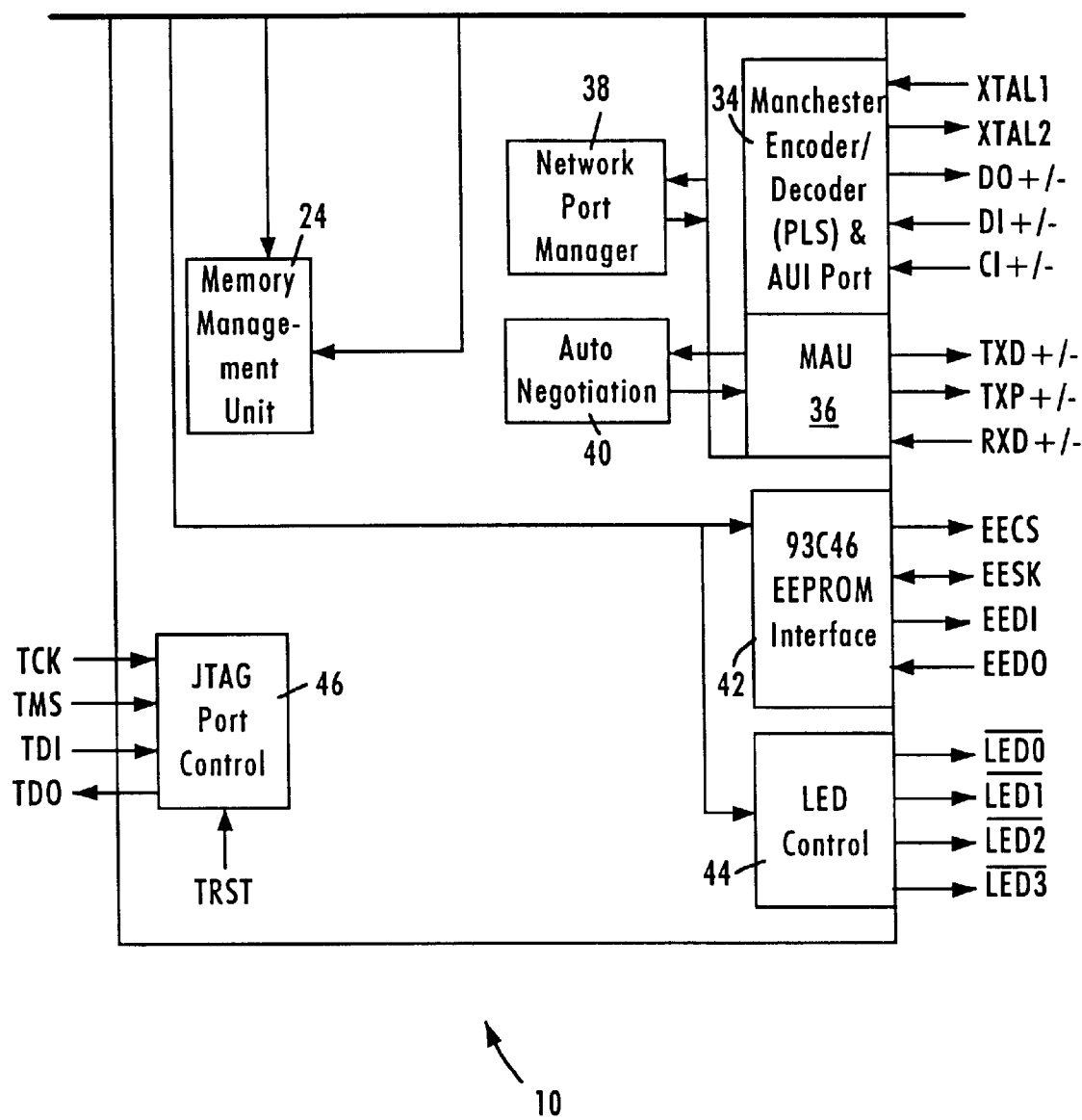

FIG. 1 is a block diagram of an exemplary network interface 10 that accesses the media of an Ethernet (ANSI/IEEE 802.3) network.

The network interface 10, preferably, a single-chip, 32-bit Ethernet controller, provides an interface between a local bus 12 of a computer, for example a peripheral component interconnect (PCI) local bus, and Ethernet-based media 50.

The interface 10 includes a PCI bus interface unit 16, a buffer memory portion 18, and a network interface portion 20. The PCI bus interface unit 16 may provide an interface with an external CPU or other host via the PCI local bus. The PCI bus interface unit 16 may include a PCI slave interface 16a and a DMA interface 16b. The slave interface 16a manages PCI control and status information including reading and programming of the PCI status registers, and is configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

In accordance with the PCI local bus specification, revision 2.1, the PCI bus interface unit 16 has an interrupt request output INTA/ used for supplying the CPU or a host with an interrupt request signal. The network interface 10 produces the interrupt request signal to indicate that one or more of status flags are set. The status flags may represent such events as receive or transmit interrupt, system error, user interrupt, etc.

A Control and Register (CAR) block 17 contains registers that support interactions between the PCI bus interface 16 and other blocks of the network interface 10. The CAR block 17 has a register interface to the PCI bus interface 16 to allow read and write accesses to the registers. A decoder may be provided in the CAR block 17 to decode register address bits from the CPU to generate select signals for each of the registers. For example, the CAR block 17 may comprise a command register that decodes commands from the CPU and sends command signals to other blocks of the network interface 10. Also, the CAR block 17 contains an interrupt management block that manages the signaling of interrupt events and the activation of the interrupt pin to send interrupts to the CPU. The interrupt management block includes interrupt registers, counters and timers for controlling interrupts. Further, the CAR block 17 generates reset signals supplied to all other blocks of the interface 10, and provides input/output control.

The memory portion 18 includes a 16-bit SRAM 18 implemented directly on the network interface chip 10. According to the disclosed embodiment, the SRAM 18 may be segmented into a receive SRAM portion 18a and a transmit SRAM portion 18b for receive and transmit paths, respectively.

The network interface 10 also includes a memory management unit (MMU) 24 controlling all transfers of data to and from the memory unit 18. The MMU 24 may be configured for managing DMA transfers via the DMA interface 16b. DMA transfers are managed based on DMA descriptors that specify start address, length, etc. The MMU 24 initiates a DMA read from the system memory into the transmit SRAM 18b by issuing an instruction to the DMA interface 16b, which translates the instructions into PCI bus cycles. Also, the MMU 24 handles DMA data transfers from the receive SRAM 18a to the system memory via the PCI bus 12. Hence, the MMU 24 contains descriptor management for DMA transfers, as well as pointers associated with storing and reading data from the memory portion 18.

The network interface portion 20 includes a media access control (MAC) core 26, a general purpose serial interface (GPSI) 28, a media independent interface (MII) 30 for connecting to an external 10 Mb/s or 100 Mb/s physical transceiver (PHY), an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking is performed in accordance with the IEEE 802.3 protocols, and may include link and programming information exchange at the MII layer using a management data clock (MDC), and management data input/output (MDIO) paths defined in the IEEE 802.3 standard.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface status registers (not shown). The network interface 10 also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown in FIG. 1) will be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down.

Figure 2:
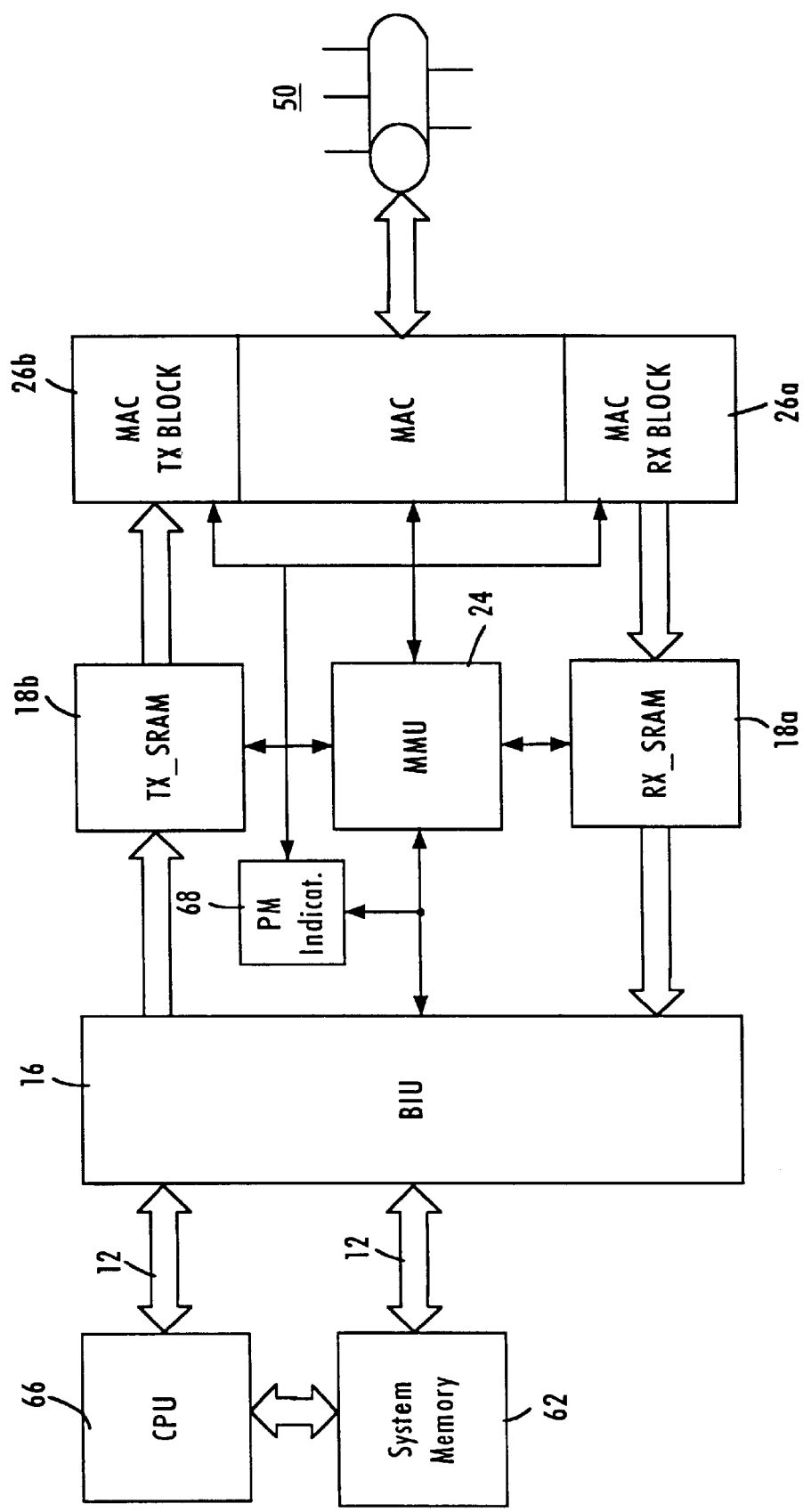
FIG. 2 is a block diagram illustrating transmit and receive data streams via the network interface.

Thus, as illustrated in FIG. 2, the network interface 10 supplies a receive data flow from the Ethernet network 50 via a MAC receive block 26a to the internal receive SRAM buffer 18a. Then, the receive data from the receive SRAM buffer 18a are transferred via the bus interface unit 16 and the PCI interface 12 to the system memory 62. A transmit data flow from the system memory 62 is transferred via the PCI interface 12 and the bus interface unit 16 to the internal transmit SRAM buffer 18b that supplies the transmit data via a MAC transmit block 26b to the network 50. The memory management unit (MMU) 24 manages the internal receive and transmit data flows.

The computer system that incorporates the network interface 10 may have power management capabilities provided to reduce the power consumption. For example, the system may be placed in a power-down mode when no activity is detected during a preset time period. Power management operations of the system are performed by the CPU 66 using software monitoring of system's activity.

If the system is placed in a power-down, when the network interface 10 performs the transmission or reception of data to or from the network 50, the data being transmitted or received will be lost. Therefore, to support power management operations, the network interface 10 is provided with a power management (PM) indication mechanism 68 that prevents transmit and receive data from being lost.

Figure 2A:
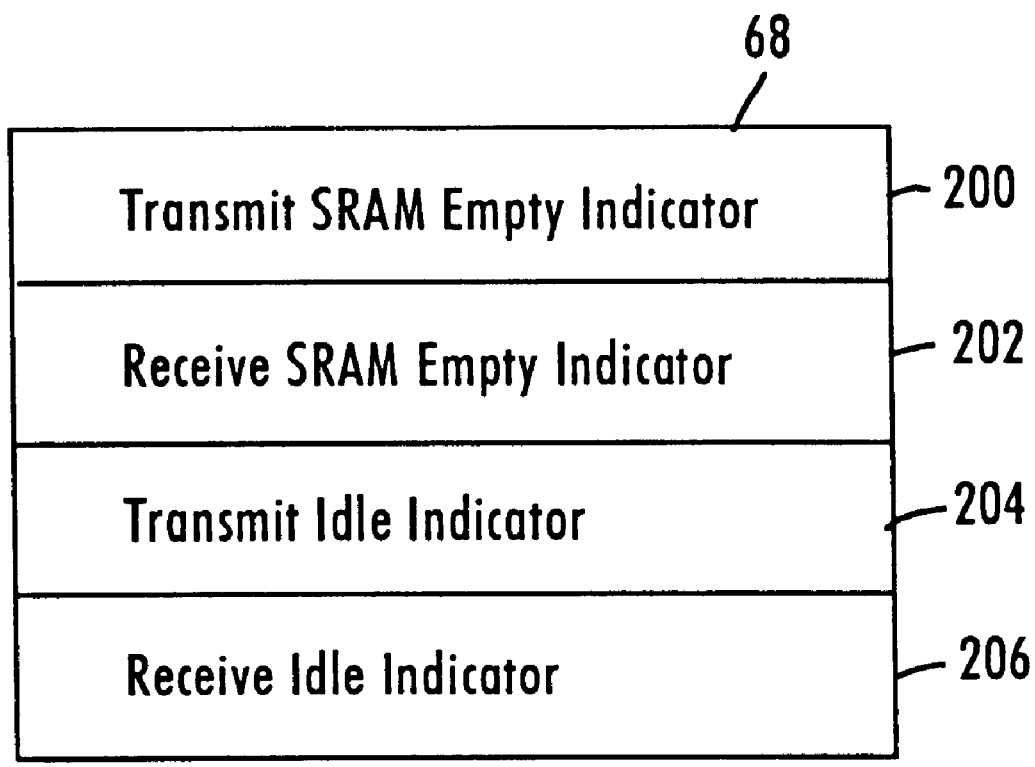
FIG. 2a is a diagram illustrating the power management indication mechanism of the present invention.

As shown in FIG. 2A, the power management indication mechanism 68 includes a transmit SRAM empty indicator 200, a receive SRAM empty indicator 202, a transmit idle indicator 204 and a receive idle indicator 206.

The transmit SRAM empty indicator 200 may be provided in an MMU transmit register to indicate that the transmit SRAM buffer 18b is empty. For example, the MMU 24 may set the transmit SRAM empty indicator 200 to 1, when the transmit SRAM buffer 18b is empty.

The receive SRAM empty indicator 202 may be provided in an MMU receive register to indicate that the receive SRAM buffer 18a is empty. For example, the MMU 24 may set the receive SRAM empty indicator 202 to 1, when the receive SRAM buffer 18b is empty.

The transmit idle indicator 204 may be provided in a MAC transmit register. The MAC transmit block 26b may set the transmit idle indicator 204 to 1 when it does not transmit data to the network 50 and there is no frame waiting to be transmitted to the network 50.

The receive idle indicator 206 may be provided in a MAC receive register. The MAC receive block 26a may set the receive idle indicator 206 to 1 when it does not detect any receive activity on the network 50, i.e. when no frames are transferred to the system from the network 50.

The CPU 66 accesses the transmit SRAM empty indicator 200, receive SRAM empty indicator 202, transmit idle indicator 204 and receive idle indicator 206 to check network activity before the system is placed in a power-down mode. When, the power management indication mechanism 68 indicates to the CPU 66 that the receive and transmit SRAM buffers 18a and 18b are empty, no frame is being transmitted or is waiting to be transmitted to the network 50, and no receive activity is detected on the network 50, the CPU 66 may place the system into a power-down mode.

When the system is placed into a power-down mod,m the CPU 66 may issue an appropriate power management command to place the network interface 10 into a power management mode. The power management command may be issued by writing the corresponding value in the command register of the network interface 10.

For example, in response to indications that the SRAM buffers 18a and 18b are empty and no transmit or receive network activity is detected, the CPU 66 may issue start magic packet mode command to place the network interface 10 into a magic packet mode. In this mode, the network interface 10 will not generate any bus master transfers, and will initiate no transmit operations on the network 50. The network interface will continue to receive frames from the network 50 to detect a magic packet used to wake up the system, but all received frames will be automatically flashed from the receive SRAM buffer 18a.

The magic packet is a frame that contains a preset data sequence. The network interface 10 performs destination address match detection to detect the magic packet. For example, the magic packet may contain a data sequence that repeats the matched physical address sixteen times in a consecutive way.

When the network interface 10 detects the magic packet, it resumes normal receive and transmit operations. Also, the network interface 10 provides a magic packet interrupt signal that asserts the interrupt pin INTA/of the PCI interface 12 to wake up the system.

Figure 3:
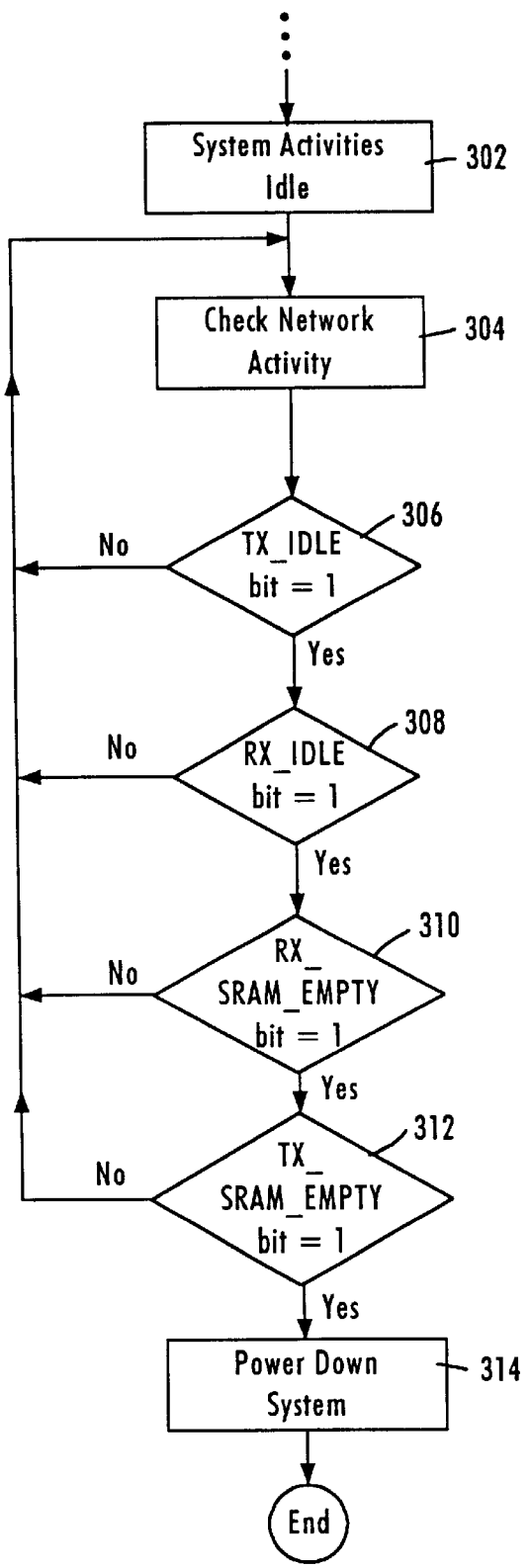
FIG. 3 is a flow chart illustrating power management operations of the present invention.

FIG. 3 shows a flow chart that illustrates operations of the power management indication mechanism 68 when the computer system, which incorporates the network interface 10, is placed into a power-down mode. When the CPU 66 detects that the system is inactive during a predetermined time period (block 302), it checks activity of the network 50 (block 304). The CPU 66 determines whether the transmit idle indicator 204 representing activity of the MAC transmit block 26b is set to 1 (block 306). If so, the CPU 66 checks whether the receive idle indicator 206 representing network receive activity is set to 1 (block 308).

If the receive idle indicator is set to 1, the CPU 66 determines the status of the receive SRAM empty indicator 202 (block 310). If this indicator is set to 1 indicating that the receive SRAM buffer 18a is empty, the CPU 66 checks whether the transmit SRAM empty indicator 200 is set to 1 (block 312). If so, the CPU 66 concludes that the transmit SRAM buffer 18b is empty and enables the system to be placed into a power-down mode (block 314).

If during operations 306 to 312, the CPU 66 determines that the transmit idle indicator 204, receive idle indicator 206, receive SRAM empty indicator 202 or transmit SRAM empty indicator 200 is not set to 1, the CPU 66 returns to the operation 304 to continue checking activity of the network 50.

Thus, the present invention provides a network interface having indicators of network activity that allow a host CPU to place the system in a power-down mode without losing data being transmitted to or received from the network.

What is claimed is:

1. In a computer system controlled by a host and having power management capabilities for supporting a power saving mode, a network interface comprising:
    a buffer memory,
    a media access control (MAC) block for supporting interface to a network, and
    a power management indication mechanism for providing the host with information on network activity when the system is placed in the power saving mode,
    wherein the power management indication mechanism comprises a MAC indicator representing status of the MAC block activity.

2. The system of claim 1, wherein the MAC indicator comprises a transmit idle indicator set to a preset state when the MAX block does not transmit data to the network and no data is waiting to be transmitted to the network.

3. The system of claim 2, wherein the MAX indicator further comprises a receive idle indicator set to a preset state when the MAX block detects no data to be received from the network.

4. In a computer system controlled by a host and having power management capabilities for supporting a power saving mode, a network interface comprising:
    a buffer memory,
    a media access control (MAC) block for supporting interface to a network, and a power management indication mechanism for providing the host with information when the system is placed in the power saving mode,
    wherein the power management indication mechanism comprises a buffer memory indicator representing status of the buffer memory in the power saving mode.

5. The system of claim 4, wherein the buffer memory indicator comprises a transmit buffer empty indicator set to a preset state when a transmit portion of the buffer memory is empty.

6. The system of claim 5, wherein the buffer memory indicator further comprises a receive buffer empty indicator set to a present state when a receive portion of the buffer memory is empty.

7. A method of providing power management in a computer system having a network interface module including a buffer memory and a MAC block, the method comprising the steps of:
    (a) determining whether the system is inactive during a predetermined time period,
    (b) checking activity of the MAC block if the system is inactive during the predetermined time period,
    (c) checking status of the buffer memory if the MAC block is idle, and
    (d) placing the system into a power-down mode if the buffer memory is empty.

8. The method of claim 7, wherein the step (b) comprises checking whether the MAC block transmits data to the network and whether data is waiting to be transmitted to the network.

9. The method of claim 8, wherein the step (b) further comprises determining whether the MAC block detects data to be received from the network.

10. The method of claim 7, wherein the step (c) comprises detecting whether a receive portion of the buffer memory is empty.

11. The method of claim 10, wherein the step (c) further comprises detecting whether a transmit portion of the buffer memory is empty.

* * * * *

UNITED STATES PATENT AND TRADEMARK OFFICE
CERTIFICATE OF CORRECTION

PATENT NO.    : 6,463,542 B1
DATED         : October 8, 2002
INVENTOR(S)   : Ching Yu et al.

It is certified that error appears in the above-identified patent and that said Letters Patent is hereby corrected as shown below:

Column 6,
Line 11, 13 and 15, change "MAX" to -- MAC --;
Line 35, change "present state" to -- to preset state --.

Signed and Sealed this

Twenty-ninth Day of April, 2003

JAMES E. ROGAN
*Director of the United States Patent and Trademark Office*